(No Model.) 2 Sheets—Sheet 1.
M. FLAMMANG.
CAMERA.
No. 271,443. Patented Jan. 30, 1883.
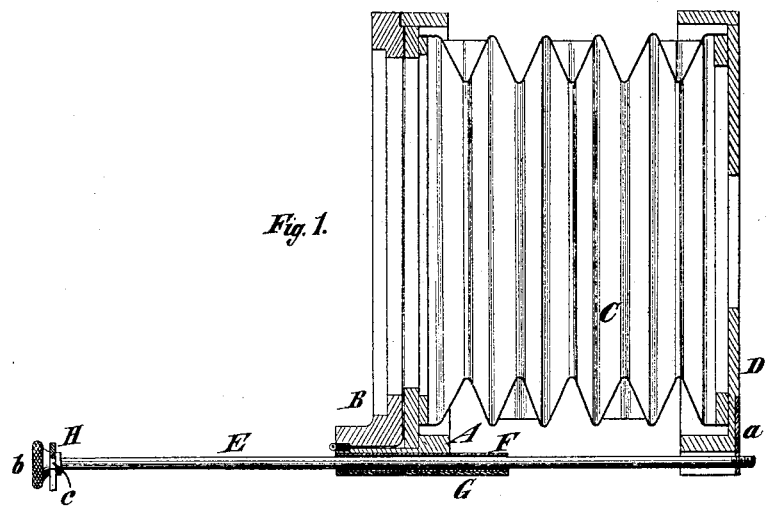
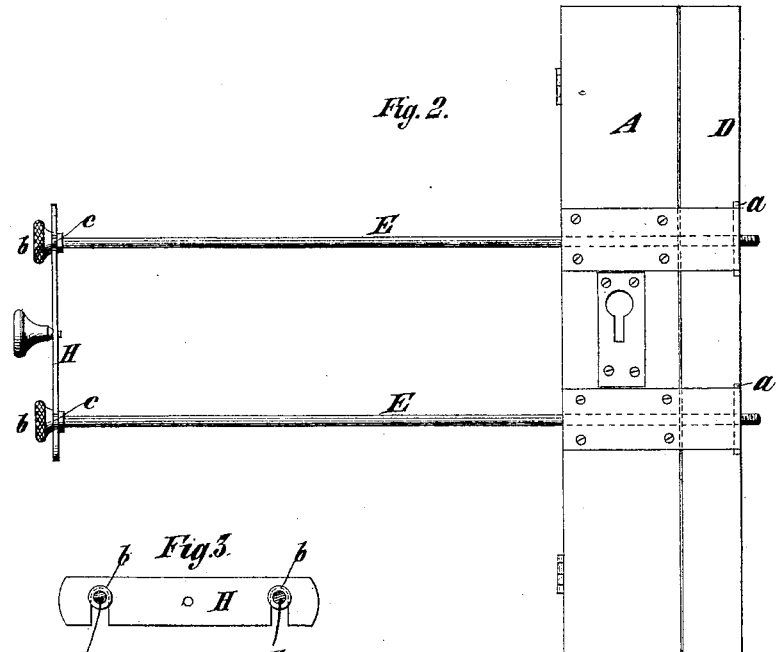
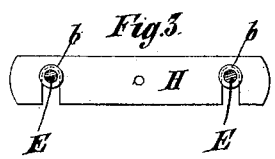
Witnesses:
T. H. Keane
James R. Bowen
Inventor:
M. Flammang
By his Atty,
Edwin H. Brown

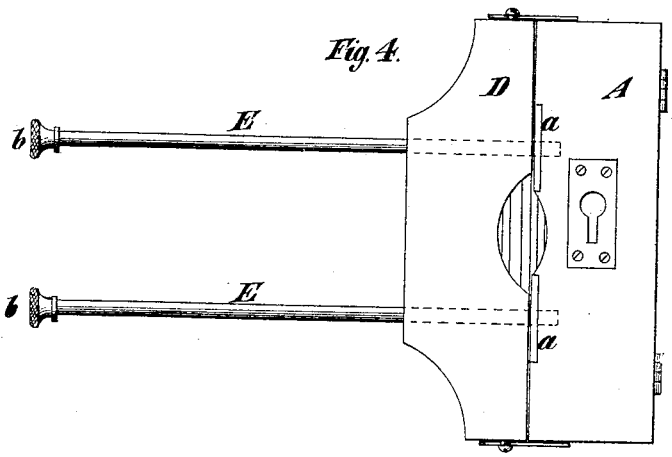

UNITED STATES PATENT OFFICE.

MATHIAS FLAMMANG, OF NEWARK, NEW JERSEY.

CAMERA.

SPECIFICATION forming part of Letters Patent No. 271,443, dated January 30, 1883.

Application filed June 8, 1882. (No model.)

*To all whom it may concern:*

Be it known that I, MATHIAS FLAMMANG, of Newark, in the county of Essex and State of New Jersey, have invented a certain new and useful Improvement in Photographic Cameras, of which the following is a specification.

The object of this improvement is to produce a photographic camera which may be packed compactly when not in use and whose fronts may be conveniently adjusted when in use.

The improvement consists in the combination, with the back and front of a photographic camera, of rods screw-threaded and adapted to engage with nuts in one of the said parts, and passing through guides arranged upon the other part, so that the front may be adjusted at pleasure. Preferably the rods are connected to the front and slide through the back, and they are extended behind the back so that they may be manipulated behind the back to adjust the front. They are preferably detachably connected, so that they may be disconnected to admit of the camera being compactly packed. A handle detachably connected to the rods may be advantageously used to enable the rods to be conveniently manipulated.

In the accompanying drawings, Figure 1 is a central longitudinal section of a photographic camera embodying my improvement. Fig. 2 is an inverted plan thereof. Fig. 3 is a transverse section of rods and a handle comprised in the same; and Fig. 4 is an inverted plan of a photographic camera embodying the improvement.

Similar letters of reference designate corresponding parts in all the figures.

In Figs. 1, 2, and 3, A designates the back of a camera, having a ground glass frame, B, hinged to its rear portion, and a bellows-like body, C, attached to its forward side.

D designates the front of the camera. It is attached to the bellows-like body, and will have the lens-tube affixed to it.

E designates metal rods, (shown as two in number,) affixed to the front D of the camera, and extending through tubes F, which are affixed to the back A of the camera, and which form guides for the rods E. They may be attached to the front by being screwed into metal plates *a*, affixed thereto, and when so attached they may be disconnected at pleasure to permit the front and back to be collapsed into contact, so that the camera may conveniently be carried in the pocket. The tubes F will preferably be made of metal and affixed to plates G, which are secured to the bottom of the back by screws or otherwise, and cover the recesses in the back in which the tubes fit. Preferably these tubes and plates are made long enough to respectively fit in and lap over the bottom of the front when the latter is in contact with the back. Then the rods will have a long bearing in the tubes, so that they will work easily therein, and, moreover, so that sufficient friction will be generated between them to cause the rods to stay in any position to which they may be adjusted. At the rear ends the rods are provided with knobs *b*, whereby they may be conveniently manipulated.

H designates a handle, which may be made of metal, and which is notched, so as to fit in grooves *c* in the knobs *b*. By grasping this handle both rods may be conveniently manipulated with one hand.

In the bottom of the back of the camera is a recess, across which is arranged a metal plate, G, by which the camera may be secured to its stand. Obviously the front of the camera may be adjusted from the rear of the camera by manipulating the rods whereby it is guided and supported.

In the camera shown in Fig. 4 the rods E are secured to the back A in the same manner in which they are secured to the front D of the camera shown in Figs. 1, 2, and 3—namely, by being screwed into metal plates *a*. They pass through holes in the front and extend beyond the same. Preferably the holes in the front will be fitted with tubes like the tubes F in the camera previously described. In this camera, which is shown in Fig. 4, the front is grasped in adjusting it. The front may be adjusted against the back and the rods E may be removed, so that the camera may be conveniently carried in the pocket. The bottom of the back A is provided with a recess and a plate, G, for securing the camera to its stand.

What I claim as my invention, and desire to secure by Letters Patent, is—

1. The combination, with the back and front of a photographic camera, of rods, screw-threaded and adapted to engage with nuts in one of said parts and passing through guides arranged upon the other part, so that the front may be adjusted at pleasure, substantially as specified.

2. The combination, with the back and front of a photographic camera, of rods attached to the front and fitted to the back, and extending beyond the back, so that they may be manipulated from behind the back to adjust the front, substantially as specified.

3. The combination, with the front and back of a photographic camera, of rods detachably secured to the front and fitted to the back, and extending beyond the back, so that they may be manipulated from behind the back to adjust the front, and a handle detachably connected to said rods behind the back of the camera, substantially as specified.

4. The combination of the back A, front D, rods E, and tubes F, substantially as specified.

M. FLAMMANG.

Witnesses:
T. J. KEANE,
JAMES R. BOWEN.